(12) United States Patent
Davito (10) Patent No.: US 9,341,301 B2
(45) Date of Patent: May 17, 2016

(54) FILL PIPE REPAIR COLLAR AND METHOD OF USE

(71) Applicant: Carlos Davito, Mesa, AZ (US)

(72) Inventor: Carlos Davito, Mesa, AZ (US)

(*) Notice: Subject to any disclaimer, the term of this patent is extended or adjusted under 35 U.S.C. 154(b) by 48 days.

(21) Appl. No.: 14/260,637

(22) Filed: Apr. 24, 2014

(65) Prior Publication Data

US 2015/0308603 A1    Oct. 29, 2015

(51) Int. Cl.
*F16L 55/168*    (2006.01)
*F16L 55/16*    (2006.01)
*B60K 15/04*    (2006.01)

(52) U.S. Cl.
CPC ............... *F16L 55/16* (2013.01); *B60K 15/04* (2013.01); *F16L 55/168* (2013.01); *B60K 2015/0458* (2013.01)

(58) Field of Classification Search
CPC .. F16L 55/16; B60K 15/04; B60K 2015/0458
USPC ............. 220/254.8, 649, 86.1, 639, 640, 641, 220/657, 659, 661, 676; 411/178, 176; 277/610, 612, 614, 608; 138/163
See application file for complete search history.

(56) References Cited

U.S. PATENT DOCUMENTS

| | | | |
|---|---|---|---|
| 3,726,549 A | 4/1973 | Bradley, Jr. | |
| 4,113,290 A | 9/1978 | Miida | |
| 4,210,374 A | 7/1980 | Churla | |
| 5,232,028 A | 8/1993 | Sunderhaus | |
| 5,472,025 A | 12/1995 | Conrad et al. | |
| 6,371,319 B2* | 4/2002 | Yeaton | ............... 215/329 |
| 6,830,085 B1 | 12/2004 | Majewski | |
| 6,851,565 B2 | 2/2005 | Stephan | |
| 6,910,720 B2* | 6/2005 | Shimei | ........ A61J 1/2089 |
| | | | 285/331 |
| 7,819,613 B2 | 10/2010 | Strom | |
| 8,292,103 B2* | 10/2012 | Weist | ........ B65D 47/0842 |
| | | | 215/252 |
| 8,348,090 B2* | 1/2013 | Crager | ............. B65D 88/54 |
| | | | 220/4.13 |
| 8,439,617 B2* | 5/2013 | Strom | ................ B23P 6/00 |
| | | | 411/386 |
| 2003/0029829 A1* | 2/2003 | Stephan | ............ B65D 47/06 |
| | | | 215/387 |
| 2009/0110509 A1* | 4/2009 | Strom | ................ B23P 6/00 |
| | | | 411/178 |
| 2013/0256305 A1 | 10/2013 | Schuller | |

* cited by examiner

*Primary Examiner* — Robert J Hicks
*Assistant Examiner* — Kareen Thomas
(74) *Attorney, Agent, or Firm* — Schmeiser, Olsen & Watts, LLP (57) ABSTRACT

A device and method of use for the repair of a leaking fuel tank fill pipe are provided. The device and method of use are designed to create a durable repair of a leaking tank fill pipe without the cost, time, and difficulty associated with replacing an entire diesel fuel tank on a semi-truck tractor. The device is a collar which threads onto damaged threads on a fill pipe neck and creates a leak-resistant seal with the fill pipe neck. A tank fill cap can then be screwed onto the collar, which forms a leak-resistant seal with the fill cap. The device may have one or more mechanisms to retain the collar on the tank fill pipe neck. The method of use may include re-cutting damaged threads on the fill pipe neck with the collar device.

14 Claims, 5 Drawing Sheets

FIG. 8

FILL PIPE REPAIR COLLAR AND METHOD OF USE

BACKGROUND OF THE INVENTION

1. Technical Field

This invention relates to a device and method for repair of a damaged tank fill pipe. Specifically, the invention relates to a device and method of use for repairing a leaking liquid holding tank fill pipe threaded neck.

2. State of the Art

The trucking industry generates approximately $650 billion of annual revenue and is responsible for over 80% of all commercial transportation based on revenue generated. There are around two million semi tractor-trailer trucks registered in the United States. A typical truck travels between 45,000 and 100,000 miles annually, depending on whether the unit's usage is regional or "long haul." Therefore, any commonly occurring condition which renders a semi-truck tractor inoperable can have a substantial economic impact.

An example of such a condition is a leaking fuel tank from damaged threads on the tank's fill pipe neck. A standard rig has two side-mounted liquid fuel tanks, each with a capacity of approximately 150 gallons. Each tank has a fill pipe and is sealed by a threaded cap screwed onto the end of the fill pipe neck. After filling the tank with fuel, the operator must securely screw the threaded cap onto the fill pipe neck. If the cap is not properly and tightly secured, engine vibration tends to loosen the connection between the tank cap and the fill pipe neck. Continued vibration between these loosened components wears the tank cap threads against the fill pipe threads, damaging the fill pipe threads. After enough thread wear, the tank cap can no longer be sufficiently tightened on the damaged threads of the fill pipe neck to prevent leakage of fuel from the tank. Leaking fuel creates a characteristic streak of grime, leaving a "leak trial" down the side of the tank and calling the situation to the attention of inspectors who will "red tag" the truck, removing it from the highway until the leaking fill pipe is repaired.

Repairing a leaking fill pipe generally requires replacing the entire fuel tank. This can take from several hours to days, depending on the availability of parts and services at the rig's location. The cost of a new aluminum diesel fuel tank alone is typically between $500 and $1,000. This cost does not include labor or account for lost revenue and other collateral losses arising from the rig's down-time while the tank is replaced. The total costs, therefore, for a single leaking fill pipe can exceed $2,000.

Accordingly, an invention is needed to create a durable repair of a leaking tank fill pipe.

SUMMARY OF EMBODIMENTS

The present invention discloses a device and method of use for repairing a leaking fill pipe.

Embodiments of the device include a fill pipe repair collar comprising a body having a first cylindrical portion and a second cylindrical portion, wherein the first cylindrical portion comprises a first outer surface; a first thread coupled to the first outer surface for connecting to a threaded cap; a first sealing surface; and a second sealing surface. The second cylindrical portion comprises a second outer surface; an inner surface; and a second thread coupled to the inner surface for connecting to a threaded till pipe neck; and a sealing member adjacent to the second sealing surface.

In some embodiments, the fill pipe repair collar further comprises a retaining mechanism wherein the retaining mechanism retains the repair collar on the fill pipe.

In other embodiments, the retaining mechanism further comprises an aperture extending through the second outer surface and the inner surface of the second cylindrical portion; and a retaining member wherein the retaining member extends through the aperture to engage the fill pipe, retaining the collar on the fill pipe.

In still other embodiments, the aperture is bounded by a third thread to receive a threaded retaining member. In some embodiments, the retaining member is a set screw. In some embodiments, the aperture is approximately orthogonal to the second outer surface.

In some embodiments, the sealing member is an elastomeric sealing member. In some embodiments, the sealing member is an O-ring. In still other embodiments, the sealing member is a gasket.

In some embodiments of the invention, the retaining mechanism further comprises a plurality of apertures extending through the second outer surface and the inner surface of the second cylindrical portion; and a corresponding plurality of retaining members wherein the retaining members extend through the apertures to engage the fill pipe, retaining the collar on the fill pipe. In some of these embodiments, the apertures are bounded by a third thread to receive threaded retaining members. In additional embodiments, the retaining members are set screws. In some embodiments of the invention, the apertures are approximately orthogonal to the second outer surface.

The invention also includes a method of use for a fill pipe repair collar. The method comprises coupling a fill pipe repair collar onto a fill pipe, and sealing the repair collar on the fill pipe. Embodiments of the invention include an additional step of retaining the repair collar to the fill pipe. Additional embodiments include an additional step cleaning the fill pipe prior to coupling the repair collar onto the fill pipe. Still other embodiments include a step cutting threads into damaged threads of the fill pipe neck after the coupling step and before the sealing step.

Embodiments of the invention further include a fuel tank comprising a fuel tank body with a fill pipe neck; and a fill pipe repair collar coupled to the fuel tank fill pipe neck, the fill pipe repair collar comprising a body having a first cylindrical portion and a second cylindrical portion, wherein the first cylindrical portion comprises a first outer surface; a first thread coupled to the first outer surface for connecting to a threaded cap; a first sealing surface; and a second sealing surface; the second cylindrical portion comprises a second outer surface; an inner surface; and a second thread coupled to the inner surface for connecting to a threaded fill pipe neck; and a sealing member adjacent to the second sealing surface. Additional embodiments include the fuel tank coupled to the fill pipe repair collar further comprising a semi-truck tractor attached to the fuel tank body. Still more embodiments include the fuel tank coupled to the fill pipe repair collar further comprising a retaining mechanism wherein the retaining mechanism retains the repair collar on the fill pipe.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Embodiments of this invention disclose fill pipe repair collar and method of use.

Figure 1:
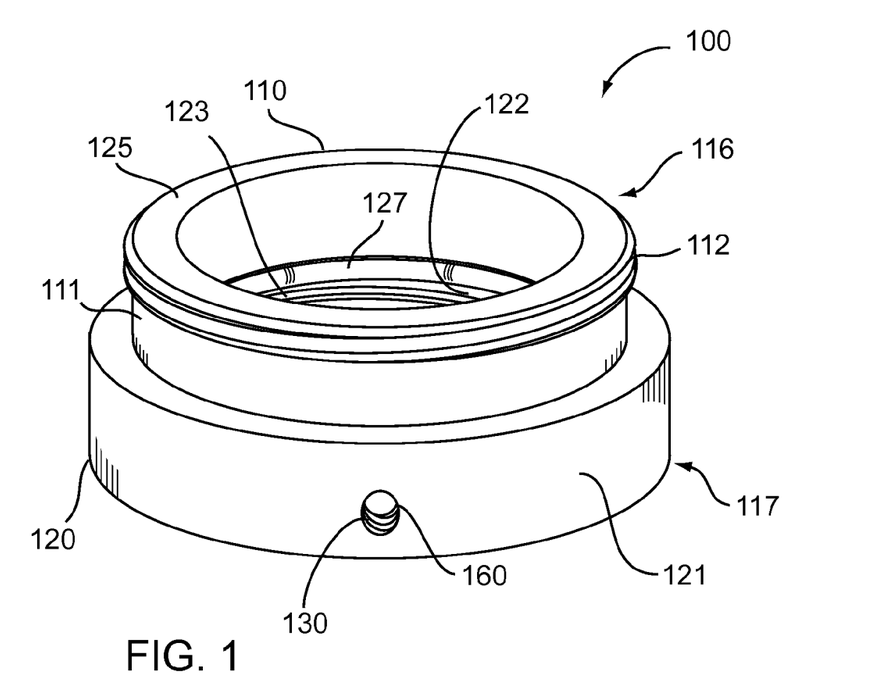
FIG. 1 is a top perspective view of a fill pipe repair collar.

FIG. 1 is a top perspective view of the fill pipe repair collar 100 device. In embodiments coupling the repair collar 100 to a fill pipe of a diesel truck fuel tank, the fill pipe repair collar 100 may be made from aluminum metal. In other embodiments, the repair collar 100 may be made of steel or other metals and metal alloys, plastics or other polymers, or any other material suitable for the particular application. The type of material used should suit the particular application and is not meant to be limiting.

In the embodiment shown in FIG. 1, the repair collar 100 comprises a body having a first cylindrical portion 110, a second cylindrical portion 120, a first end 116, and a second end 117. The body may be a unitary body of the first cylindrical portion 110 and the second cylindrical portion 120. In the embodiment shown in FIG. 1 and throughout the figures, the first cylindrical portion 110 and the second cylindrical portion 120 have a first diameter 118 and a second diameter 119 respectively (See FIG. 4). A different width first diameter 116 and second diameter 117 are shown, however this is not a limiting feature of the various embodiments of the invention. In situations where the original or other standard-sized tank cap is used with the repair collar, the first diameter 118 and the second diameter 119 will necessarily be different widths, as illustrated in the embodiment depicted in FIG. 1, wherein the first diameter 118 is smaller than the second diameter 119. The different widths are necessary for use with the original tank cap because the larger width of the second diameter 119 relative the first diameter 118 is required to fit over the tank fill neck 170 (See FIG. 7). Alternatively, if a cap sized differently than the original will be used to close the tank following attachment of the repair collar, the first diameter 118 may have a larger, smaller, or similar diameter as the second diameter 119 to correspond with the size of the cap used.

FIG. 1 also illustrates the first outer surface 111 of the first cylindrical portion 110 with a first thread 112. The first thread 112 is configured to engage with threads on the inside surface of a tank cap 180 (See FIG. 7). A limited portion of the inner surface 122 of the second cylindrical portion 120 is also shown. More detailed views of the inner surface 122 can be found in FIGS. 5, 6, and 7.

FIG. 1 also shows the first sealing surface 125 located on the first end 116. The first sealing surface 125 contacts the tank cap sealing member 181 (See FIG. 7) and forms a first seal 182 when the tank cap 180 is threaded onto the repair collar 100. The relationship between the first sealing surface 125 and the tank cap 180, including the tank cap sealing member 181, is shown in the FIG. 7 sectional view of the repair collar coupled with the tank cap. A feature of the first sealing surface 125 is its generally flat configuration corresponding with the sealing surface of most standard semi-truck tractor diesel fuel tank caps. The flat configuration of the first sealing surface 125 greatly increases the surface area of the seal between the repair collar 100 and the tank cap 180. This is an improvement over the original sealing surface between a fuel tank cap and most tank fill necks which have a narrow and rounded lip at the terminus of the fill neck. Tank caps 180 typically utilize an elastomeric sealing member 181 interposed between the tank cap 180 and the third sealing surface 190 of a tank fill neck 170. Where the repair collar 100 is used, the total contact pressure necessary to create a leak-proof seal between the tank cap 180 and the repair collar 100 across a tank cap sealing member 181 is distributed over a substantially larger area defined by first sealing surface 125, thereby decreasing the pressure per unit area across the tank cap sealing member 181. The lower pressure per unit area tends to preserve the elasticity of an elastomeric sealing member, increasing the useful life of the tank cap sealing member 181. The flat first sealing surface 125 also minimizes deformation of a tank cap sealing member 181 which exists where there are unequal shear forces arising from pressure against a rounded fill neck terminus comprising the third sealing surface 190 of the tank fill neck. Less deformation of the tank sealing member 181 and a lower required contact force per unit area both decrease the chance and frequency of tank leaks from the tank cap 180 and may increase the useful life of the tank sealing member 181.

The inner surface 122 contains a second thread 123. The second thread 123 corresponds with threads on the outside of the tank fill neck 170. In some embodiments of the invention, the repair collar 100 is constructed such that the second thread 123 acts as a die to re-cut the damaged threads on the fill pipe neck 170. In the aforementioned and other embodiments, the second thread 123 is cut such that the width and pitch of the second threads match the width and pitch specifications for the damaged threads on the fill pipe neck 170. Embodiments of the invention also include the second thread 123 mated to the tank fill neck 170 according to ASME/ANSI standards and tolerances for threaded fittings and/or pipe unions.

The second outer surface 121, as seen in FIG. 1, may be generally smooth in some embodiments of the invention and roughened or otherwise textured in other embodiments of the invention. Still other embodiments of the invention feature a second outer surface 121 which is not round but polygonal with facets upon which a conventional pipe wrench can be applied to tighten the repair collar 100 against the tank fill neck. In embodiments of the invention employing a generally smooth or textured second outer surface 121, a strap wrench may be applied to the second outer surface 121 to tighten the repair collar 100 against the tank fill neck.

Some embodiments of the invention employ a retaining mechanism 201. Other embodiments employ a plurality of retaining mechanisms 201. In the embodiment of the invention illustrated in FIG. 1 (and in FIGS. 2, 3, and 5), each retaining mechanism 201 comprises an aperture 160 which extends from the second outer surface 121 through the inner surface 122 of the second cylindrical portion 120. For each retaining mechanism 201 in an embodiment, the aperture 160 receives a retaining member 200 (shown in FIGS. 2, 3, 4 and 6), used to retain the repair collar 100 on the tank fill neck 170 following tightening of the repair collar 100 using a wrench or other device as described above. The use of one or more retaining mechanisms 201 serves to retain the repair collar 100 in place on the tank fill neck 170 and to prevent loosening of the fill pipe repair collar 100 from the tank fill neck 170. The use of one or more retaining mechanisms 201 resists axial and torsional forces which tend to loosen the repair collar 100 from the fill pipe neck 170, such as, but not limited to, vapor pressure within a fuel tank that can translate to an axial force sufficient to strip the threads from the fill pipe neck 170 or torsional forces arising from engine vibration. In the embodiments of the invention utilizing a retaining member 200 which is threaded, such as a set screw for example, each aperture contains a third thread 130 corresponding to threads present on the retaining member(s) 200. In embodiments featuring greater than one retaining mechanism, the apertures 160 may be spaced at approximately equal angles around the circumference of the second cylindrical portion 120, so that the forces exerted by the retaining members 200 against the fill pipe neck 170 are approximately evenly distributed around the circumference of the fill pipe and help keep the repair collar 100 substantially centrally aligned on the fill pipe neck 170.

Figure 2:
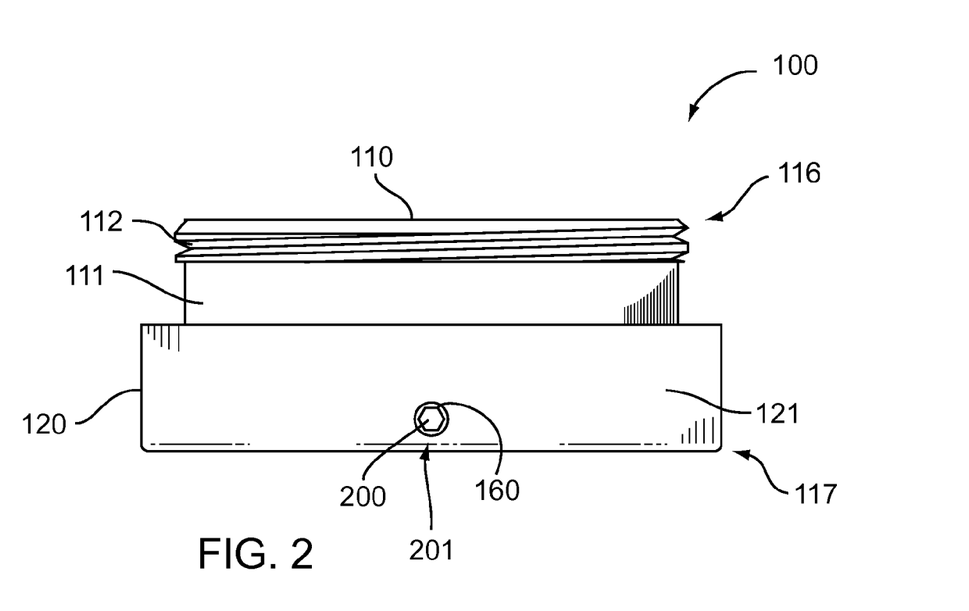
FIG. 2 is a side view of a fill pipe repair collar.
Figure 3:
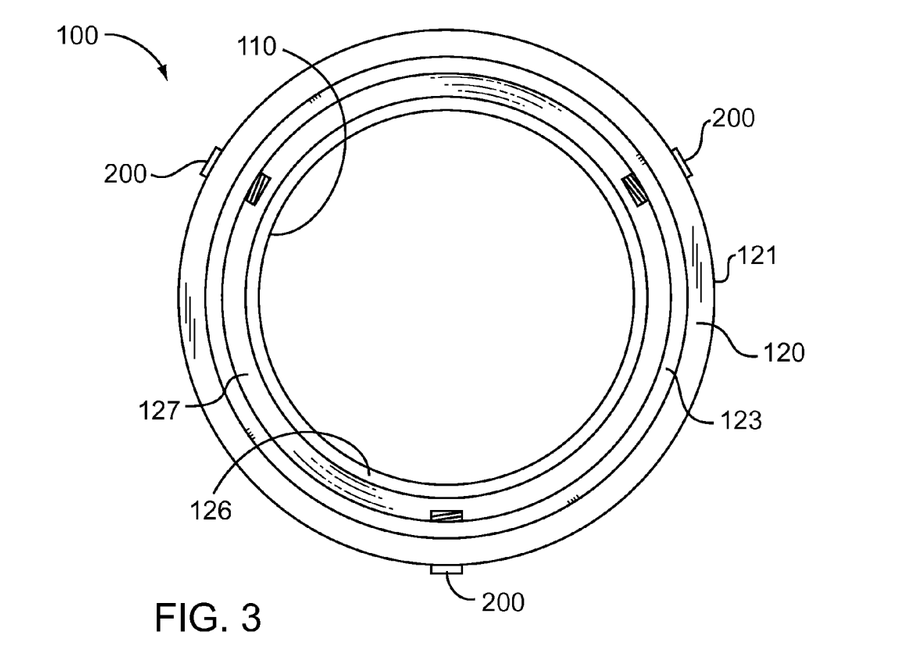
FIG. 3 is a bottom view of a fill pipe repair collar.

In the embodiments shown in FIGS. 1, 2, and 3, the aperture(s) 160 are lined by a third thread 130 to accept a set screw. Embodiments utilizing a retaining member 200 which is not threaded, for example a locking pin, would not utilize a third thread 130. A set screw retaining member 200 may be a hex bolt that is tightened against the fill pipe neck 170 with a hex-key wrench. In other embodiments of the invention, the retaining member 200 may be a bolt that is tightened against the fill pipe neck 170 with a wrench. In still other embodiments of the invention, the retaining member 200 has an end extending through the inner surface 122 and contacting the threads of the fill pipe neck 170 which is shaped in a configuration to engage the threads of the fill pipe neck 170, increasing the contact area between the retaining member 200 and the fill pipe neck 170 with a corresponding increase in friction between these two surfaces. This increased friction created by the retaining member(s) 200 between the fill pipe repair collar 100 and the tank fill pipe neck 170 results in greater resistance to the aforementioned axial and torsional forces tending to loosen the repair collar 100 from the tank fill neck 170. In various embodiments of the invention, the end of the retaining member 200 contacting the fill pipe neck 170 may be flat, domed, cone-shaped, cupped, have a knurled surface, or have an extended point such as a pilot point or dog point. In these and similar embodiments, the retaining function of the retaining member(s) 200 to retain the repair collar 100 onto the fill pipe neck 170 is enhanced. There are many types of retaining members 200 which can be used in various embodiments of the invention, and only a few are listed as examples. The listing is not intended to be complete or limiting; the embodiments described are by way of example only. Other embodiments utilizing different types of retaining mechanism(s) 201 will be apparent to those skilled in the art.

FIG. 1 also shows the sealing member 127. The sealing member 127 contacts the inner surface 122 and the second sealing surface 126. The second sealing surface 126 is not seen in FIG. 1, but is illustrated in FIGS. 3, 5, 6, and 7. In some embodiments of the invention, the sealing member 127 is a gasket made from a rigid material, such as metal or plastic. In other embodiments of the invention, the sealing member 127 is a gasket made from an elastomeric material, such as a synthetic rubber, plastic, or other elastomer. In still other embodiments of the invention, the sealing member is an O-ring made from elastomeric material. The materials suggested are by way of example only; other possible materials for use in the sealing member 127 will be apparent to those skilled in the art.

In the embodiments, the sealing member 127 is removably held in place against the second sealing surface 126 by the portion of the second thread 123 nearest the second sealing surface 126. Also, the sealing member 127 is pressed outwardly against the inner surface 122 and upwardly against the second sealing surface 126 in response to pressure exerted by the tank fill neck 170 when the repair collar 100 is tightened into place on the tank fill neck 170 (See FIG. 7).

FIG. 2 is a side view of the fill pipe repair collar 100 device. In the embodiment illustrated in FIG. 2, there is one retaining mechanism 201 comprising an aperture 160 and a retaining member 200, which is a set screw in this embodiment. Other embodiments may employ a plurality of retaining mechanisms 201. In one embodiment, three retaining mechanisms 201 are used, with apertures 160 distributed around the perimeter of the second cylindrical portion 120 equidistant from one another, as shown in FIG. 3. Other embodiments of the invention may use no mechanism 201, one mechanism 201, or any number of mechanisms 201.

Figure 7:
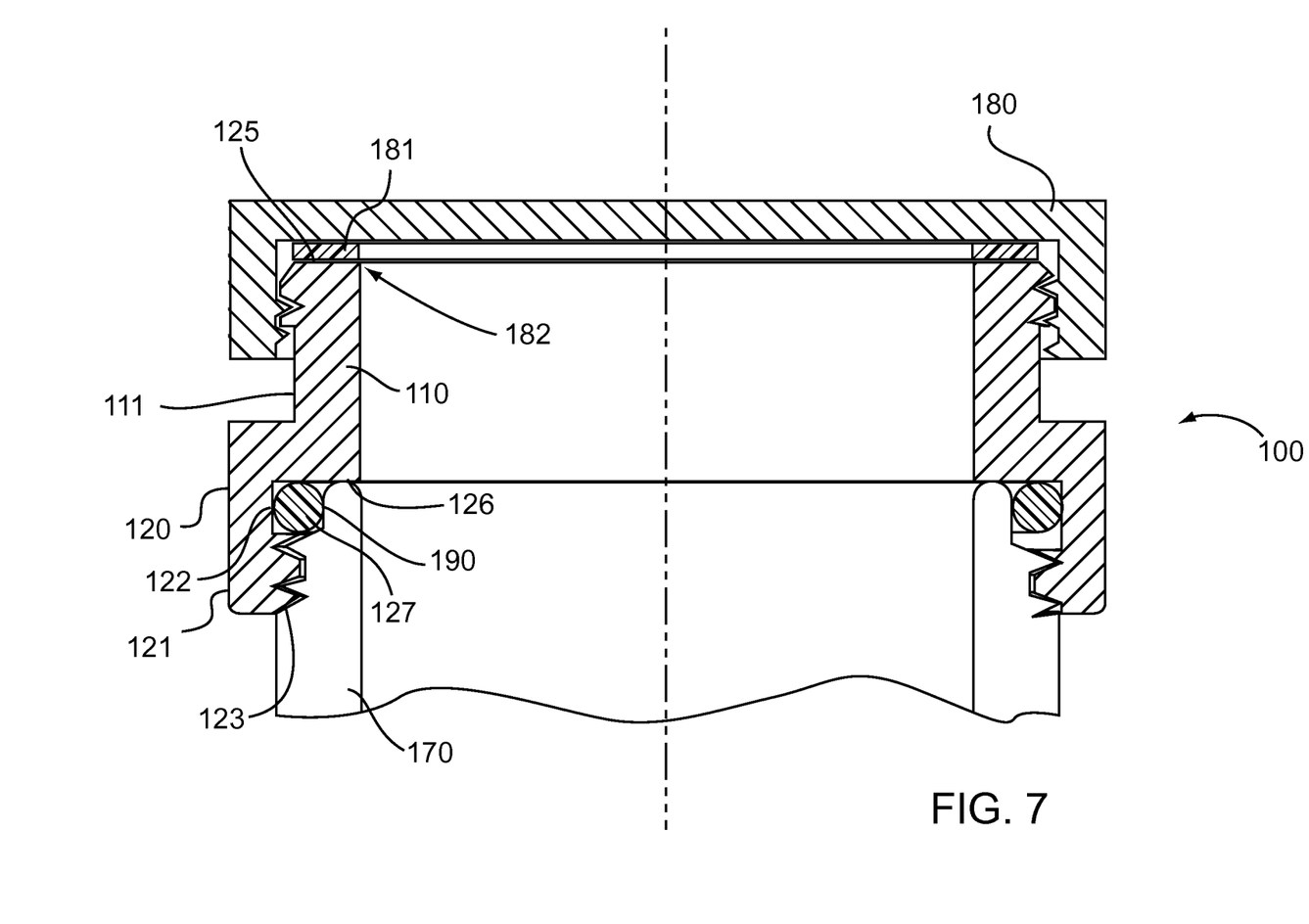
FIG. 7 is a section view of a fill pipe repair collar assembled with a tank fill pipe and tank cap.

The distance the first outer surface 111 of the first cylindrical portion 110 extends beyond the second outer surface 121 of the second cylindrical portion need only be of adequate or longer length for the tank cap to be securely tightened on the first thread 112 to bring the tank cap sealing member 180 in firm contact with the first sealing surface 125, creating a leak-resistant first seal 182 between the tank cap 170 and the fill neck repair collar 100, as shown in FIG. 7.

FIG. 3 is a bottom view of the fill neck repair collar 100 device. In the embodiment shown, the relationship between the first cylindrical portion 110 and the larger diameter second cylindrical portion 120 can be seen. Additionally, the position of the sealing member 127 between the second threads 123 and the second sealing surface 126 of the first cylindrical portion 110 is shown. In this embodiment, three retaining mechanisms 201 are shown spaced equally about the perimeter of the second cylindrical portion. The second thread 123 of the repair collar 100 is threaded onto the tank fill neck 170 and tightened, sealing the fill neck 170 against the sealing member 127. Afterward, the three retaining mechanisms 201 shown in this embodiment are secured against the fill neck 170 to retain the repair collar 100 in place.

Figure 4:
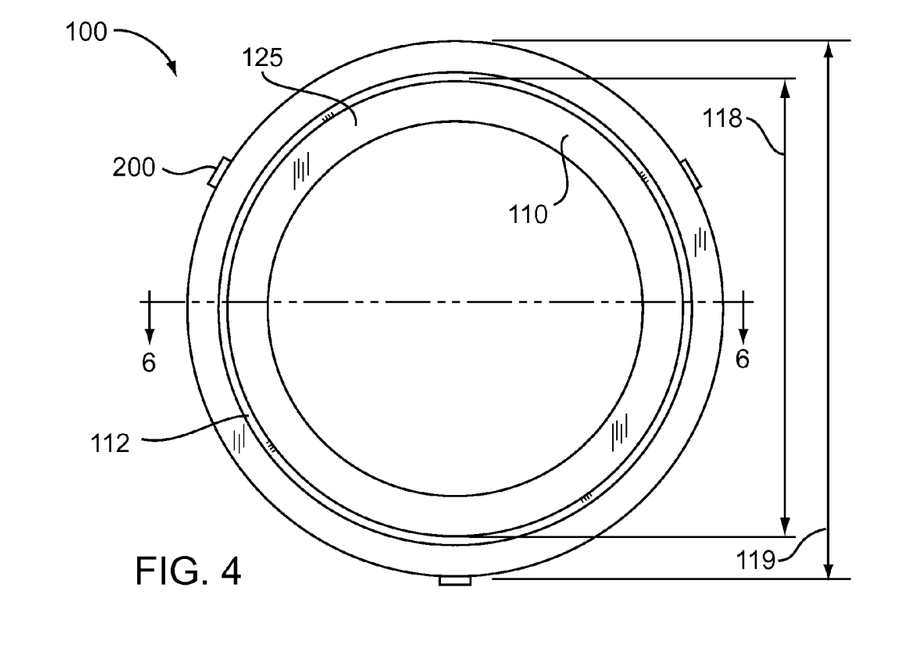
FIG. 4 is a top view of a fill pipe repair collar.

FIG. 4 is a top view of the fill neck repair collar 100 device. When the repair collar 100 is in use, the tank cap is screwed onto the first thread 112 covering the first cylindrical portion 110 whereby a sealing member 181, if any, located on the inner surface of the tank cap is brought into contact with the first sealing surface 125 at the end of the first cylindrical portion 110. In this way, the tank cap and the first sealing surface create a leak-resistant first seal 182 between the fill neck repair collar 100 and the tank cap 180. FIG. 4 demonstrates the broad, flat first sealing surface 125 which matches the flat sealing surface of the tank cap and increases the total surface area of the seal between the tank cap 180 and the fill neck repair collar 100, and gives rise to the aforementioned advantages of a broad, flat sealing surface. In the embodiment shown in FIG. 4, the second cylindrical portion 120 is of a larger diameter 119 than the diameter 118 of the first cylindrical portion 110, thereby fitting over a tank fill neck were an original diameter tank cap 170 is used to close the tank.

Figure 5:
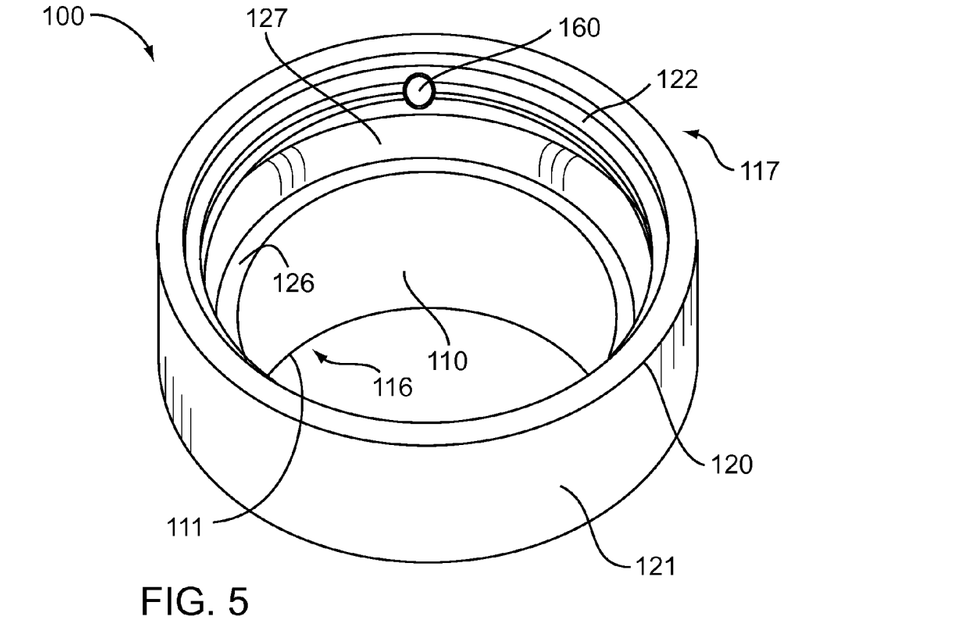
FIG. 5 is a bottom perspective view of a fill pipe repair collar.

FIG. 5 is a bottom perspective view of the fill neck repair collar 100 device. In the embodiment shown, there is one aperture 160. In other embodiments, there are three apertures 160 evenly distributed around the perimeter of the second cylindrical portion 120. In other embodiments, each aperture 160 includes a third thread 130. In some embodiments of the invention, a third thread 130 will be present in each aperture 160. In other embodiments of the invention, the third thread 130 is present in none of the apertures 160. In some embodiments of the invention, the retaining member 201 is a smooth pin which is hammered through the aperture 160 to contact the tank filler neck, retaining the repair collar 100 into place. A retaining mechanism 201 which is a smooth pin does not require a third thread 130.

FIG. 5 also shows a portion of the sealing member 127 nested against the second sealing surface 126 of the first cylindrical portion 110 and held in this position by friction between the second sealing surface 126 and the second thread 123. A portion of the second sealing surface 126 is seen protruding from beneath the sealing member 127, although this is not meant to be limiting. The sealing member 127 may be narrower, equal to, or slightly wider than the width of the second sealing surface 126 according to the contour and diameter of the tank fill neck 170 for which the particular embodiment of the invention is designed. Although FIG. 5 shows the aperture 160 located adjacent to the sealing member 127, this is not intended to be limiting. The aperture(s) 160 may be located anywhere within the inner surface 122 of the second cylindrical portion 120 such that a retaining member 200 extending across the aperture 160 will engage the tank fill neck 170, retaining the fill neck repair collar 100 in a fixed position.

Figure 6:
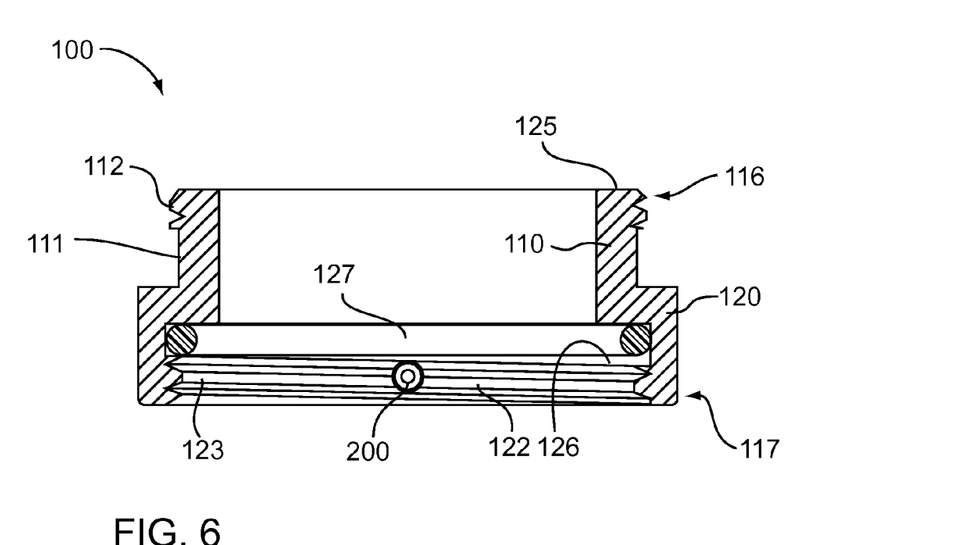
FIG. 6 is a section view of the fill pipe repair collar taken along line 6-6 of FIG. 4.

FIG. 6 depicts a cross sectional view of the tank fill neck repair collar 100 taken along line 6-6 of FIG. 4. FIG. 6 shows the relationship between the first cylindrical portion 110 and the second cylindrical portion 120 which together form the body of the fill neck repair collar 100. The sealing member 127 is shown positioned and held in place between the second thread 123 and the second sealing surface 126. Where the tank fill neck 170 diameter is equal to or only slightly larger than the inner diameter of the sealing member 127, the sealing member 127 is pushed upward against the second sealing surface 126 and outward against the inner surface 122 of the second cylindrical portion 120 as the second thread 123 is contacted and tightened over the threads of the tank fill neck 170. In embodiments of the invention where the sealing member 127 is composed of an elastomeric material, this upward and outward pushing action tends to slightly deform the sealing member 127, enhancing the leak-resistant seal between the fill neck repair collar 100 and the tank fill neck 170. The relationship between the tank fill neck 170, sealing member 127, and the second sealing surface 126 is shown in FIG. 7. A retaining member 200 is present in the embodiment shown. The broad, flat first sealing surface 125 is also seen in the figure.

FIG. 7 depicts an expanded sectional detail view of the tank fill neck repair collar 100 engaged on a fill pipe neck 170, with a tank cap 180 engaged on the collar 100. The first cylindrical portion 110 and the second cylindrical portion 120 are shown as two general regions of the unitary structure forming the body of the tank neck repair collar 100. In the embodiment shown, the tank cap 180 threads onto the first thread 112 of the fill pipe repair collar 100, bringing the first sealing surface 125 in contact with the tank cap sealing member 181. In most, but not all, applications, the tank cap sealing member 181 is made from an elastomeric material, such as synthetic rubber for example. The fill pipe neck 170 shown in FIG. 7 has a rounded lip at its terminus. This is commonly the case with fill pipe necks 170 found on the diesel fuel tanks used on semi-truck tractors. It can be appreciated that where the tank cap sealing member 181 contacts the fill pipe neck 170 at this rounded lip, a sealing surface of relatively limited surface area results. This is in comparison to the much larger surface area of the seal created when the fill pipe repair collar 100 is interposed between the fill pipe neck 170 and the tank cap sealing member 181. Where the total force across the connection between the tank cap sealing member and the fill neck is across a narrow, curved area, the force is unequal across the seal and tends to deform the tank cap elastomeric sealing member, resulting in more leaks and a shortened useful life of the tank cap sealing member. The broad flat surface area of the seal between the fill pipe neck 170 and the tank cap sealing member 181, however, more evenly distributes the total force across the seal resulting in a lower force per unit area necessary to achieve a seal. This tends to result in a more effective seal and very little deformation of the tank cap sealing member 181, increasing the useful life of the elastomeric tank cap sealing member 181.

FIG. 7 also shows the sealing member 127 interposed between the second thread 123 and the second sealing surface 126. The uppermost thread on the tank fill neck 170 exerts a force component, through the sealing member 127, against the second sealing surface 126 and an additional force component against the inner surface 122. This combination of forces works to create a double-seal: a seal between the sealing member 127 and the second sealing surface 126; and an additional seal between the sealing member 127 and the inner surface 122. In embodiments of the invention where an elastomeric sealing member 127 is used, this double-seal mechanism at the junction of the fill neck repair collar 100 and the fill pipe neck 170 further contributes to the leak-resistant functionality of the invention.

Figure 8:
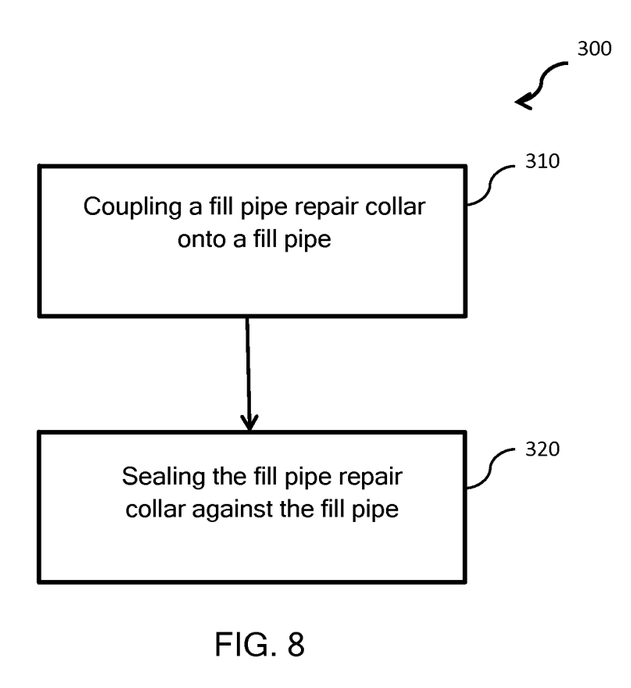
FIG. 8 is a flowchart diagramming a method of use for a fill pipe repair collar.

FIG. 8 depicts a flowchart diagramming the steps of a method of use 300 for the fill pipe repair collar.

The first step 310 comprises coupling a fill pipe repair collar 100 onto a fill pipe neck 170. In the embodiment illustrated in FIGS. 7 and 8, the coupling step 310 involves threading the fill pipe repair collar onto the fill pipe neck. Some embodiments of the invention may require a cleaning step wherein the threaded surface of the fill pipe neck 170 is cleaned with a suitable cleaner, such as a solvent, water, or other appropriate substance, prior to coupling the repair collar 100 onto the pipe neck 170. This cleaning step reduces the chance that abrasive grit on the threads of the fill pipe neck 170 will damage the threads of the pipe neck 170 or the second thread of the repair collar 100, or contact either or both the second sealing surface 126 and the second inner surface 122 to interfere with the function of the sealing member 127.

In other embodiments of the invention, the coupling step 310 may involve the act of repairing damaged threads of the fill pipe neck 170 as the repair collar 100 is screwed onto the fill pipe neck 170. The second thread 123 is cut at a width and pitch angle such as found in cutting dies for the size thread on the fill pipe neck 170 to which the repair collar 100 is to be coupled. Where embodiments of the invention employ cutting of the fill pipe neck threads during this coupling step, a strap wrench or other suitable tool is applied to the second outer surface 121 to produce the additional leverage necessary to smoothly couple the repair collar 100 to the fill pipe neck 170 while simultaneously re-cutting the fill pipe neck threads.

A second step 320 comprises sealing the repair collar 100 onto the fill pipe neck 170. The sealing step 320 may require the application of a suitable tool, a strap wrench for example, to the second outer surface 121 to securely tighten the fill pipe repair collar 100 on the fill pipe neck 170 sufficient to form a leak-resistant second seal with the sealing member 127 interposed between the second sealing surface 160 and the fill pipe neck 170. Strap wrenches are commonly available in a wide variety of sizes for different applications, generally inexpensive, and are familiar to mechanics and others skilled in the art.

In additional embodiments, a third step comprises retaining the repair collar to the fill pipe. This is accomplished by one or more retaining mechanisms 200. In some embodiments, the retaining mechanism 200 employs a retaining member 201 extending through a corresponding aperture 160. After the repair collar 100 is sealed onto the fill pipe neck 170 in the preceding step, the retaining member (s) 200 is passed through the aperture(s) 160 until the end of the retaining member 200 extends through the inner surface 122 and firmly engages the threads of the fill pipe neck 170, or otherwise contacts and engages the fill pipe neck 170.

This invention overcomes the aforementioned and other difficulties encountered with using prior art, like the necessity of replacing an entire fuel tank because of damaged threads on the fill pipe neck, for example. It is designed to create a durable repair of a leaking tank fill pipe neck without the cost, time, and difficulty associated with replacing the entire tank. The widespread availability of a fill pipe repair collar will aid semi-truck tractor drivers, owner-operators, and trucking companies utilizing tractor-trailer trucks to transport goods to increase efficiency and reduce operating costs. This invention also has applications for use in many other situations requiring the creating of a durable, straightforward, and reliable repair of a damaged tank fill pipe neck.

Exceptional results can be obtained with the fill pipe repair collar device apparatus and process described in the various embodiments of the invention. The device is inexpensive to manufacture and easy to use. Thus, the disclosed method of use and various embodiments of the tank neck repair device have immediate applicability in the trucking and transportation industries, and similarly across other applications.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A fill pipe repair collar comprising:
   a body having a first cylindrical portion and a second cylindrical portion, wherein:
   the first cylindrical portion comprises:
      a first outer surface;
      a first thread coupled to the first outer surface for connecting to a threaded cap;
      a first sealing surface; and
      a second sealing surface;
   the second cylindrical portion comprises:
      a second outer surface;
      an inner surface; and
      a second thread coupled to the inner surface for connecting to a threaded fill pipe neck;
   a sealing member adjacent to the second sealing surface; and
   a retaining mechanism that retains the repair collar on the threaded fill pipe neck,
      comprising:
         an aperture extending through the second outer surface and the inner surface of the second cylindrical portion; and
         a retaining member wherein the retaining member extends through the aperture to engage the threaded fill pipe neck, retaining the collar on the threaded fill pipe neck.

2. The collar of claim 1, wherein the aperture is bounded by a third thread to receive a threaded retaining member.

3. The collar of claim 1, wherein the retaining member is a set screw.

4. The collar of claim 1, wherein the aperture is approximately orthogonal to the second outer surface.

5. The collar of claim 1, wherein the sealing member is an elastomeric sealing member.

6. The collar of claim 5, wherein the sealing member is an O-ring.

7. The collar of claim 5, wherein the sealing member is a gasket.

8. A fill pipe repair collar comprising:
   a body having a first cylindrical portion and a second cylindrical portion, wherein the first cylindrical portion comprises:
      a first outer surface;
      a first thread coupled to the first outer surface for connecting to a threaded cap;
      a first sealing surface; and
      a second sealing surface;
   the second cylindrical portion comprises:
      a second outer surface;
      an inner surface; and
      a second thread coupled to the inner surface for connecting to a threaded fill pipe neck;
   a sealing member adjacent to the second sealing surface; and
   a retaining mechanism that retains the repair collar on the threaded fill pipe neck,
      comprising:
         a plurality of apertures extending through the second outer surface and the inner surface of the second cylindrical portion; and
         a corresponding plurality of retaining members wherein the retaining members extend through the apertures to engage the threaded fill pipe neck, retaining the collar on the threaded fill pipe neck.

9. The collar of claim 8, wherein the apertures are bounded by a third thread to receive threaded retaining members.

10. The collar of claim 8, wherein the retaining members are set screws.

11. The collar of claim 8, whereby the apertures are approximately orthogonal to the second outer surface.

12. A fuel tank comprising:
    a fuel tank body with a fill pipe neck; and
    a fill pipe repair collar coupled to the fuel tank fill pipe neck, the fill pipe repair collar comprising:
    a body having a first cylindrical portion and a second cylindrical portion, wherein:
    the first cylindrical portion comprises:
       a first outer surface;
       a first thread coupled to the first outer surface for connecting to a threaded cap;
       a first sealing surface; and
       a second sealing surface;
    the second cylindrical portion comprises:
       a second outer surface;
       an inner surface; and
       a second thread coupled to the inner surface for connecting to a threaded fill pipe neck; and
    a sealing member adjacent to the second sealing surface.

13. The fuel tank of claim 12, further comprising a semi-truck tractor attached to the fuel tank body.

14. The fuel tank of claim 12, further comprising a retaining mechanism wherein the retaining mechanism retains the repair collar on the fill pipe neck.

* * * * *